United States Patent [19]

Vento

[11] Patent Number: 5,632,220
[45] Date of Patent: May 27, 1997

[54] THRU-HULL MOUNTED AERATOR WITH ANTI-VAPOR LOCK MECHANISM AND METHOD FOR AERATION

[76] Inventor: Thomas J. Vento, 4916 Pelican Dr., New Port Richy, Fla. 34652

[21] Appl. No.: 712,067

[22] Filed: Sep. 11, 1996

Related U.S. Application Data

[63] Continuation-in-part of Ser. No. 432,966, May 1, 1995, Pat. No. 5,582,777.

[51] Int. Cl.$^6$ .................................................. B63B 35/26
[52] U.S. Cl. .................... 114/255; 43/57; 261/29; 261/59; 261/64.1; 261/121.2
[58] Field of Search .................... 114/255; 415/169.1; 43/56, 57; 261/29, 59, 64.1, 121.2

[56] References Cited

U.S. PATENT DOCUMENTS

| | | | |
|---|---|---|---|
| 2,845,870 | 8/1958 | Lock | 415/169.1 |
| 2,969,742 | 1/1961 | Arutunoff | 415/169.1 |
| 3,820,272 | 6/1974 | Rowe et al. | 43/57 |
| 4,033,280 | 7/1977 | Wood et al. | 114/255 |
| 4,074,651 | 2/1978 | Arduser | 114/255 |
| 4,708,084 | 11/1987 | Campau | |
| 4,832,073 | 5/1989 | Campau | 43/57 |
| 4,913,620 | 4/1990 | Kusiak et al. | |
| 4,970,982 | 11/1990 | Martin | 114/255 |
| 5,010,836 | 4/1991 | Riviezzo | 114/255 |
| 5,236,175 | 8/1993 | Campau | 43/57 |
| 5,275,762 | 1/1994 | Burgess | |
| 5,449,454 | 9/1995 | Hickok | |

OTHER PUBLICATIONS

*E&B Discount Marine Catalog '96*, pp. 295–297, 304–305 and 321.

*Primary Examiner*—Tim R. Miles
*Attorney, Agent, or Firm*—Dominik & Stein

[57] ABSTRACT

A device for prevention or clearing of air lock in a thru-hull aerator comprising an air relief outlet in communication with the impeller housing. More specifically, an air relief outlet is provided in the pump impeller upstream of the impeller. Attached to the air relief fluid outlet is a flexible air relief hose and check valve which is in communication with the atmosphere. When the pressure in the air relief hose drops below a predetermined level due to vapor lock, a valve in the air relief hose opens and air is permitted to vent, thereby clearing the vapor lock.

22 Claims, 8 Drawing Sheets

THRU-HULL MOUNTED AERATOR WITH ANTI-VAPOR LOCK MECHANISM AND METHOD FOR AERATION

REFERENCE TO RELATED APPLICATIONS

This is a continuation-in-part of application Ser. No. 08/432,966 filed May 1, 1995, U.S. Pat. No. 5,582,777.

BACKGROUND OF THE INVENTION

1. Field of the Invention

The present invention is directed to an aerator, and more particularly, a thru-hull aerator adapted for being mounted through the hull of a boat for oxygenating a live bait well, the aerator provided with an air-release mechanism to prevent or clear air-lock of the aerator pump.

2. Description of the Related Art

When fishing from a boat, it is a common practice to bring along bait fish or aquatic organisms in tanks known as live wells. In order to keep the bait fish alive for many hours, or even days, an aerator must be provided to replenish the oxygen in the water as it is depleted by the bait fish. Several distinct types of aerators have been developed.

For example, there are United States patents drawn to aerators wherein water is sucked through a pump and sprayed out a distributor manifold in the form of small jets above the surface of the water (U.S. Pat. No. 3,822,498), aerator pumps which cause air to bubble up for the bottom of the container to thereby aerate the water, and U.S. Pat. No. 5,139,659 teaches an air-lift water pump, aerator and filter wherein bubbles travel up a water-lift tube, bringing along entrained water. Many aerators and aerator systems utilize centrifugal rotary bilge pumps which are well known in the art.

In addition, there are numerous ways in which an aerator may be utilized on board a boat. For instance, a "self-contained" aerator may be placed into a bait bucket, adapted cooler or recirculating live well. Often, larger or commercial fishing boats have aerators which employ thru-hull transom installations. These aerator systems pump water from outside of the boat into a live well, the live well typically having an overflow which allows excess circulating water to flow out of the live well. Typically, the thru-hull aerator includes a pumping means which includes a through-transom fitting mounted in the boat transom below the normal water line and the pump is mounted inside the boat on a fitting with a hose leading from the pump to the live well. Generally, the fitting is mounted below the planing surface so that the thru-hull fitting draws fresh water from outside the hull.

In aerators and aerator systems which employ centrifugal bilge-type pumps (which are not self-priming), air lock in the pump can be a frequent problem. Air lock can be a particularly significant problem in thru-hull aerator installations. If the supply of water through the thru-hull fitting is not adequate (i.e., when the water intake fitting rises above the water level or when rough water causes the water intake to be exposed to the air), a pocket of air develops in the pump impeller, the pump looses it's prime and becomes air locked. Once an air lock develops, the pump ceases to pump water, and this condition jeopardizes the bait fish in the live well. The back air pressure in the impeller pump output lines in combination with the pressure of the outside water at the intake scoop causes an air bubble to be held at the impeller, causing continuous air lock.

Typically, air lock is cleared from the pump by turning the centrifugal pump off thus releasing the back pressure of air and allowing the water in the pump outlet hose to descend back through the centrifugal pump, thereby forcing any trapped air out of the impeller chamber. The pump is then restarted, and in theory, but not always in practice, the pump resumes the normal pumping of water. An alternative means to "jump start" an air locked impeller, especially when the aerator is mounted in the boat transom, is to rapidly drive the boat in reverse thereby forcing water into the uptake fitting and pump chamber to clear the air lock. However, both of these methods are impractical in that they presuppose that the boat operator is aware that the pump has become air locked. Often, especially with a live well full of bait fish, the time lapse between the pump becoming air locked and its detection can mean the death of many bait fish.

Numerous attempts have been made over the years to invent an aerator which prevents or relieves airlock. One pump designed to prevent airlock, currently available on the market, is an "anti-airlock" pump manufactured by Rule. This pump incorporates a device which is designed to periodically detect whether there is air present at the pump impeller. If air is detected at the pump impeller, the device shuts the pump off in an attempt to relieve the air through the impeller output line. However, this device is of limited success in application since the device does little to proactively clear the airlock and the impeller pump may remain inactive for an extended period of time while the device tests for continued air lock.

U.S. Pat. No. 4,913,620 teaches a centrifugal water pump in which the pumping chamber is horizontally oriented and such chamber has two wall portions or sectors of different radii. One wall portion has a radius substantially the same as the outer most radial path of the impeller blades and the other wall portion has a radius substantially constant but slightly greater than the radius of the radical path of the impeller blades. Connecting the two chamber wall portions are terminal walls, one of which is located adjacent to the outlet port. A first deflecting wall directs the pumped water upward into the outlet port. A second deflecting wall breaks up any air and air bubbles and fills any space wherein air or air bubbles could collect. The device of Kusiak et al. is mechanically complex and in order to function properly the device requires the divider wall to create a positive and negative pressure (as opposed to a normal flow of water) which actually reverses the flow of water, thereby allowing any trapped air to escape.

U.S. Pat. No. 5,449,454 to Hickok teaches an apparatus for expelling gas from within a sealed container. The device of Hickok is particularly designed for use with canister-type aquarium filters, is mechanically complex and is not suited to a thru-hull orientation.

Finally, U.S. Pat. Nos. 5,213,718 and 5,275,762 teach aerators wherein an impeller draws a water and air mixture down through an upwardly directed impeller inlet into a cavitation zone (i.e., the centrifugal pump is mounted upside down compared to the normal operating position). When the centrifugal pump rotates, the vacuum formed in the cavitation zone by rotation of the impeller will draw air through the air tube into the cavitation eye where a portion of the air will be entrained in the water flowing through the vaned impeller and out the water flow directing means into the tank. Excess air drawn into the cavitation eye through the inlet tube can escape upwardly through the water inlet thereby preventing air locking of the impeller, as would occur if air were to accumulate in the cavitation zone of a centrifugal pump mounted in the "normal" pump operating position, with the water inlet opening downwardly. The pump preferably floats on the water with the air/water inlet for the centrifugal pump immediately below the surface. Such a system has a number of attendant problems. First, a centrifugal pump is designed to be operated in a certain orientation. The pump may be operated upside down near the surface for periods of time without damage; however, if operated upside down at depth for any length of time, air in the motor housing will exit through the seal between the motor shaft and the impeller, and water will enter the motor housing, thereby causing damage. Further, if the pump is operated on the surface, oxygenation of the water will occur near the surface of the tank, and the lower reaches of the bait well will not be aerated.

Further yet, if the pump is operated at depth, the design must permit escape of excess air out through the water inlet so as to prevent air locking of the pump, or to permit flooding and restarting of an air-locked pump. The design must thus anticipate the various depths at which the pump may be operated, and the air-escape parameters for each depth. Such a design can not optimize the air/water mixture for maximum oxygenation of the pump at every given depth. As a result of these design constraints, the oxygenation efficiency is adequate, but much less than optimal.

In view of the foregoing, it is an object of the present invention to provide an aerator which eliminates or minimizes the above-mentioned and other problems, limitations and disadvantages typically associated with conventional aerators, and to prevent air lock of the pump impeller while simultaneously providing an aerator which achieves a high level of oxygenation of the water in a live well.

SUMMARY OF THE INVENTION

The present inventor has investigated and experimented with various aerators and pumps, and discovered that the problem could be solved by providing an air relief line to the pump, such that upon build up of air in the impeller and loss of suction by the impeller, air in the impeller is immediately vented out through the air relief line, thereby clearing the air lock. Preferably, the air relief line is provided with a valve which remains closed while in communication with by the vacuum or suction at the inlet side of the pump. Once the pump looses vacuum, two things happen: (1) the valve is no longer held closed, and (2) air trapped in the pump is free to rise and is vented out through the air relief line. As the air is cleared, water flows into the pump, and the pump can again begin pumping. As the pump develops suction, the air relief line valve which is in communication with the pump inlet is subject to the vacuum and closes. The pump then operates normally.

Following extensive experimentation, the present inventor was able to determine that a conventional centrifugal pump could be modified so as to prevent or clear air locks by providing (1) a chamber or conduit in communication with the pump inlet in which air will accumulate in the case of an air lock, (2) air relief tubing through which said air from the air lock can travel, (3) a check valve which is in communication with the pump inlet via the relief tubing, which is held closed when the pump is operating and creating vacuum, and which is not held closed by vacuum when the pump is not creating a vacuum.

A preferred thru-the-hull aerator of the present invention, designed for mounting within a boat and aeration of a live bait well, can comprise: a centrifugal type pump comprising an impeller and a pump housing having at least one inlet and first and second outlets with the second outlet provided upstream of the impeller, and the first outlet provided downstream of the impeller. In this case, the first outlet is in communication with the bait well to be aerated, and the second outlet is in communication with the air relief line and valve.

It is an object of the present invention to provide an aerator which prevents airlock of the aerator pump, which may be conveniently mounted thru-the-hull of a boat, which does not require constant monitoring by the operator of the boat.

It is a further object of the present invention to provide a thru-the-hull mounted aerator which is not mechanically complex and effectively prevents airlock of the aerator pump without a substantially increase in electric consumption.

It is a further object of the present invention to provide a mechanism by which airlock may be prevented in currently available centrifugal pumps.

It is a further object of the present invention to provide an aerator which has a gentle action and does not harm the bait fish in the live well.

A significant feature of the present invention resides in the use of an aerator having dual outlets, preferably the secondary outlet being disposed between the water inlet and the impeller chamber such that surplus air is vented to the atmosphere and does not affect the prime of the aerator.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the concept and the specific embodiments disclosed may be readily utilized as a basis for modifying or designing other aerators for carrying out the same purposes of the present invention. It should also be realized by those skilled in the art that such equivalent structures do not depart from the spirit and scope of the invention as set forth in the appended claims.

DETAILED DESCRIPTION OF THE DRAWINGS

For a fuller understanding of the nature and objects of the present invention reference should be made by the following detailed description taken in with the accompanying drawings in which.

DETAILED DESCRIPTION OF THE INVENTION

The present invention is directed to a thru-hull mounted aerator for a live bait well. As used herein, the terms aerator and oxygenator have the same meaning. After extensive investigation, the present inventor has discovered that airlock of the aerator pump impeller can be prevented or cleared by providing an aerator with dual outlets such that surplus air is released to the atmosphere rather than being retained at the impeller. The invention is based on the discovery that airlock can be prevented in a thru-the-hull mounted aerator by providing an air relief outlet in the impeller housing. More specifically, an air relief outlet (secondary outlet) is provided upstream of the impeller. Attached to the air relief outlet is a flexible air relief hose which is in communication with the atmosphere, preferably through a check valve.

The term "centrifugal pump" as used herein is intended to mean a pump which utilizes the throwing force of a rapidly moving impeller. The liquid is pulled in at the center or eye of the impeller and is discharged at the outer rim of this impeller. By the time the liquid reaches the outer rim of the impeller, it has acquired considerable velocity. The liquid is then slowed down by being led through either a volute or a conical housing. The simplest method for converting dynamic pressure to static pressure is to slowly increase the volute delivery channel area (e.g., a taper of no greater than 8°). This is known as a diffuser and is often used on small pumps. As the velocity of the liquid decreases, its pressure increases. The shape of the outlet has the effect of changing the low-pressure, high velocity fluid to high pressure, low velocity. That is, some of the mechanical kinetic energy is transformed into mechanical potential energy. In other words, the velocity head is partially turned into a pressure head.

The aerator employed in the present invention may also be of the type having a second air line in communication with the impeller inlet for feeding a small, continuous flow of a gas containing oxygen (either atmospheric or oxygen under pressure) to the impeller. The pump is characterized by the employment of a rapidly rotating impeller to mince this air from the second air line with water. The precise manner in which the impeller minces the air and water and creates air bubbles is not understood, but it is logical to assume that the rapid changes of direction from (1) axial at the eye to (2) radial in the impeller to (3) axial between the impeller tip and the outlet to (4) radial at the water outlet, and also the changes in speeds, pressures, shear forces, and other forces acting within the impeller have an effect on the formation of bubbles.

An aerator preferably employed in the present invention is characterized by the employment of the rapidly rotating impeller of the centrifugal pump to mince air and water prior to delivery to the live well. The centrifugal pumps as used in the present invention are basically similar to a wheel, with vanes or blades called impeller blades sandwiched between an upper and a lower housings. A fluid tight means is supplied for driving this impeller. For ease of construction, one of the upper or lower impeller housings may be eliminated so long as the free upper or lower sides of the impeller blades are in close proximity to the impeller chamber housing. An impeller thus differs from a propeller mainly in that (1) an impeller operates using centrifugal force, while a propeller does not, and (2) an impeller has a upper and lower housing or case for throwing fluids out radially, while a propeller has only blades which pushes liquid in a direction axially parallel with the propeller shaft. A propeller type pump can not achieve the ultra-fine bubbles.

An impeller may be of either the centrifugal pump type or the compressor type, with centrifugal pump type impellers being greatly preferred. Pump impellers are generally cast in one piece with a hub; compressor impellers are generally fabricated.

The present invention is applicable to any non-priming pumps employed in association with thru-hull aeration.

The device according to the present invention will now be discussed in greater detail by reference to the drawings.

Figures 1, 1A:
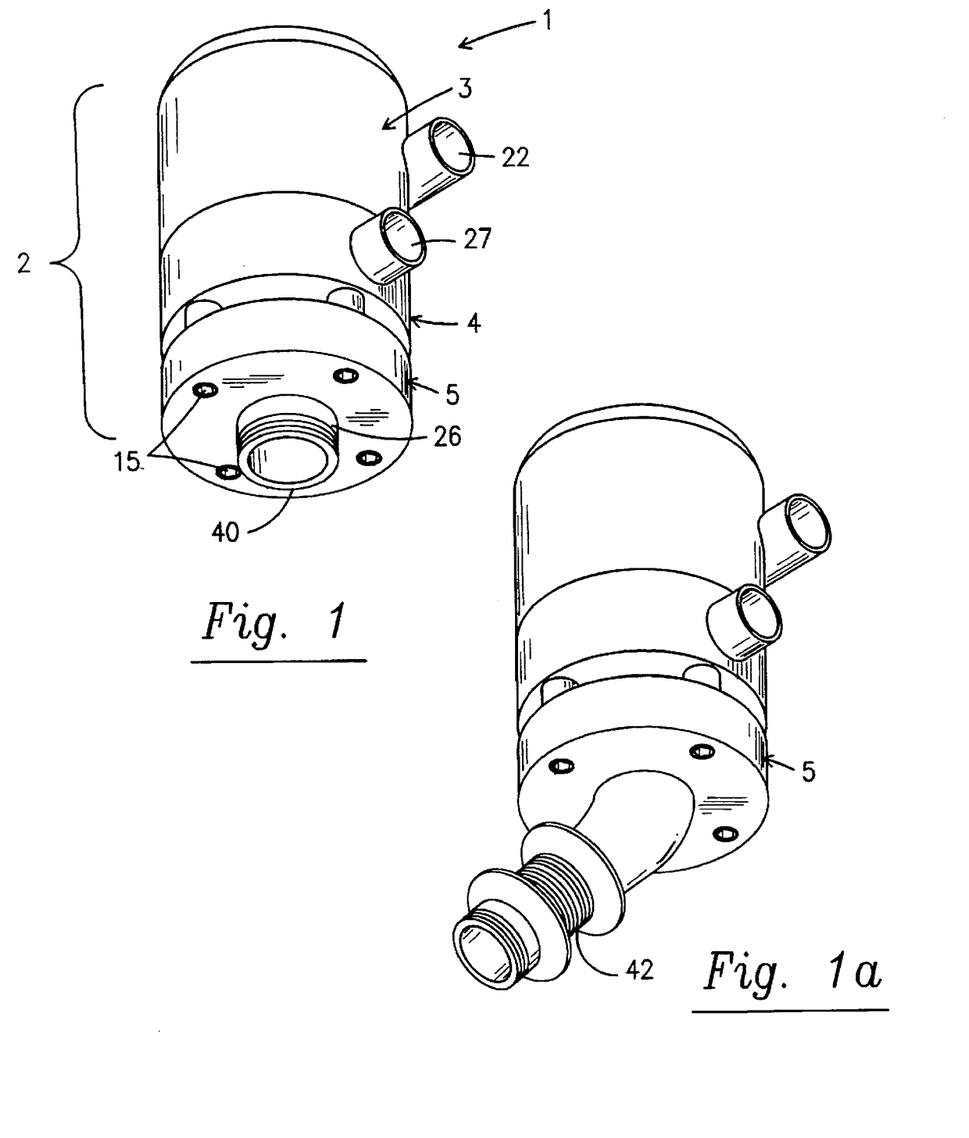
FIG. 1 is a plan view of an aerator illustrating a first embodiment of the present invention having a straight pick up tube.
FIG. 1a is a plan view of an aerator illustrating a first embodiment of the present invention having an angled pick up tube.

FIG. 1 illustrates a plan view of a first embodiment of the aerator 1. The aerator of this invention includes a housing 2, this housing may be constructed as an integral piece or segmented pieces coupled together. Preferably, the housing is constructed in segments (as illustrated) comprising an impeller housing 3, an air release outlet segment 4 and a base segment 5. The base segment is comprised of at least an outer wall and a transverse wall, and has apertures to receive fasteners. Any coupling hardware known in the aerator/centrifugal pump industry may be utilized to couple the housing segments together; however, the impeller housing 3, air release outlet segment 4 and base segment 5 are preferably connected by screws 15. Preferably, the screws 15 are positioned through the air release segment and base segment and into screw bosses 20 (FIG. 2) located in the impeller housing.

Figure 2:
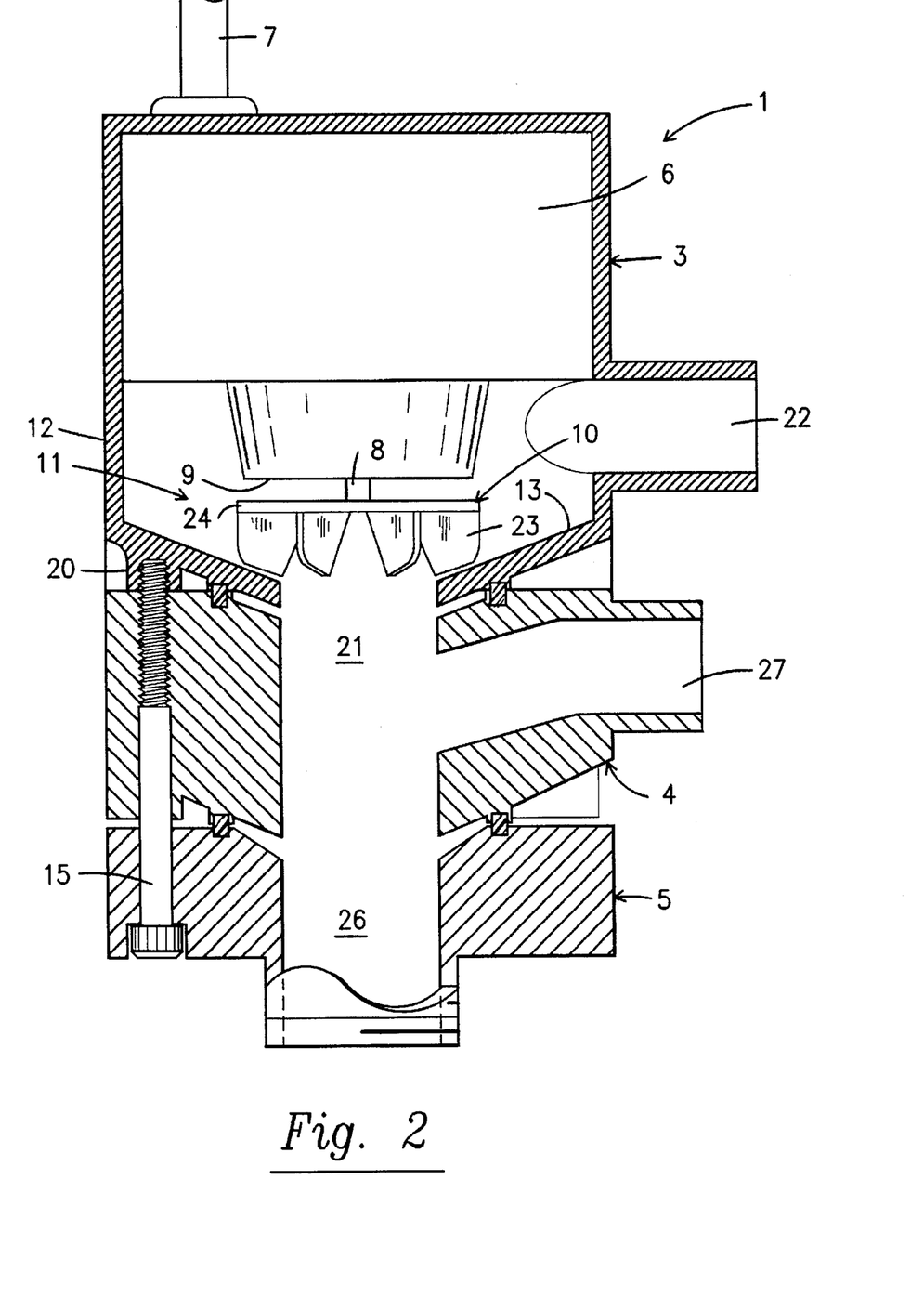
FIG. 2 is a cross-sectional view of a first embodiment of the aerator of the present invention.

As illustrated in FIG. 2, the aerator 1 comprises a water impermeable motor casing 6. An electric motor or drive means (not shown) of any conventional design is mounted within the motor casing 6. The drive means may be of any suitable construction such as the type utilized in a RULE bilge pump, for example, a RULE 1100 GPH bilge pump. Basically, any conventionally available centrifugal pumps available in the fishing industry can be used for the purposes of the present invention, The RULE 1100 GPH bilge pump, which has a 2⅜ inch pump diameter, is well suited for a conventional sized boat live well and thru-hull mounting. For larger applications, a larger bilge pump such as the RULE 3700 GPH or Attwood Bilge King 2000 may be utilized. A major supplier of such pumps is E&B Discount Marine, Inc. of 201 Meadow Road, P.O. Box 3138, Edison, N.J., as found in E & B Discount Marine, Inc. Catalog '96, pages 295–297, 321, incorporated herein by reference.

The motor may be powered by any suitable means such as an internal battery, an external portable battery, or via electrical connections to the main electrical supply system of a boat (in which case the electric drive motor includes insulated and encased electrical conductors 7. The ends of the electrical connection means may be provided with electrically conductive clamps (not shown) whereby the clamps may be clamped to the terminals of an electric battery or other source of electrical power. The portable power supply (not shown) may be provided in a housing which can be mated integral with the motor casing 6, or may be located outside the motor casing and inside or outside the boat transom, in which case external electrical connection means 7 are required.

A drive shaft 8 extends through the motor casing bottom 9 and is connected to a centrifugal rotary impeller 10. A water flow directing means 11 is provided on the bottom of, and integrally connected to, the impeller housing 3, and comprises a generally cylindrical outer wall portion 12 and a transverse wall bottom portion 13. The impeller housing 3 is shaped so as to encompass the impeller 10 and to define a water inlet 21 area and a first fluid outlet area 22. In the design as illustrated in FIG. 2, the water inlet area is immediately below, and co-axial with, the drive shaft 8 and "eye" of the impeller 10. The first water outlet 22 is oriented laterally in the impeller housing 3 about the impeller for conveying aerated water to the live bait well.

The impeller 10 comprises a top disk-shaped impeller plate 24 which is fixed at its center to the drive shaft 8. The impeller 10 is provided with a plurality of impeller vanes 23 which are attached radially to the impeller disk 24. The vanes extend downwardly and are in close tolerance with the bottom wall portion 13 of the impeller housing 3. The respective vanes projecting generally perpendicularly from said impeller disk and having flow passages defined therebetween, the inner edges of said plurality of vanes defining an impeller inlet eye. The top impeller plate 24 and the bottom wall portion 13 of the impeller housing thus define the axial flow directing boundaries of the impeller through which the impeller vanes urge the water. As will be discussed in more detail below, water is drawn from outside of the boat and travels to the impeller 10 through first water conduit 26.

What differentiates the aerator of the present invention from those known in the art is an air release outlet segment 4. This invention utilizes a second air-fluid outlet 27, which is located between the first water conduit 26 that conveys water from outside of the boat, and the impeller housing 3 which houses the impeller 10 and the first fluid outlet 22. The second fluid or air outlet 27 permits trapped air or air bubbles which might otherwise cause airlock of the impeller to be released to the atmosphere.

Figure 3:
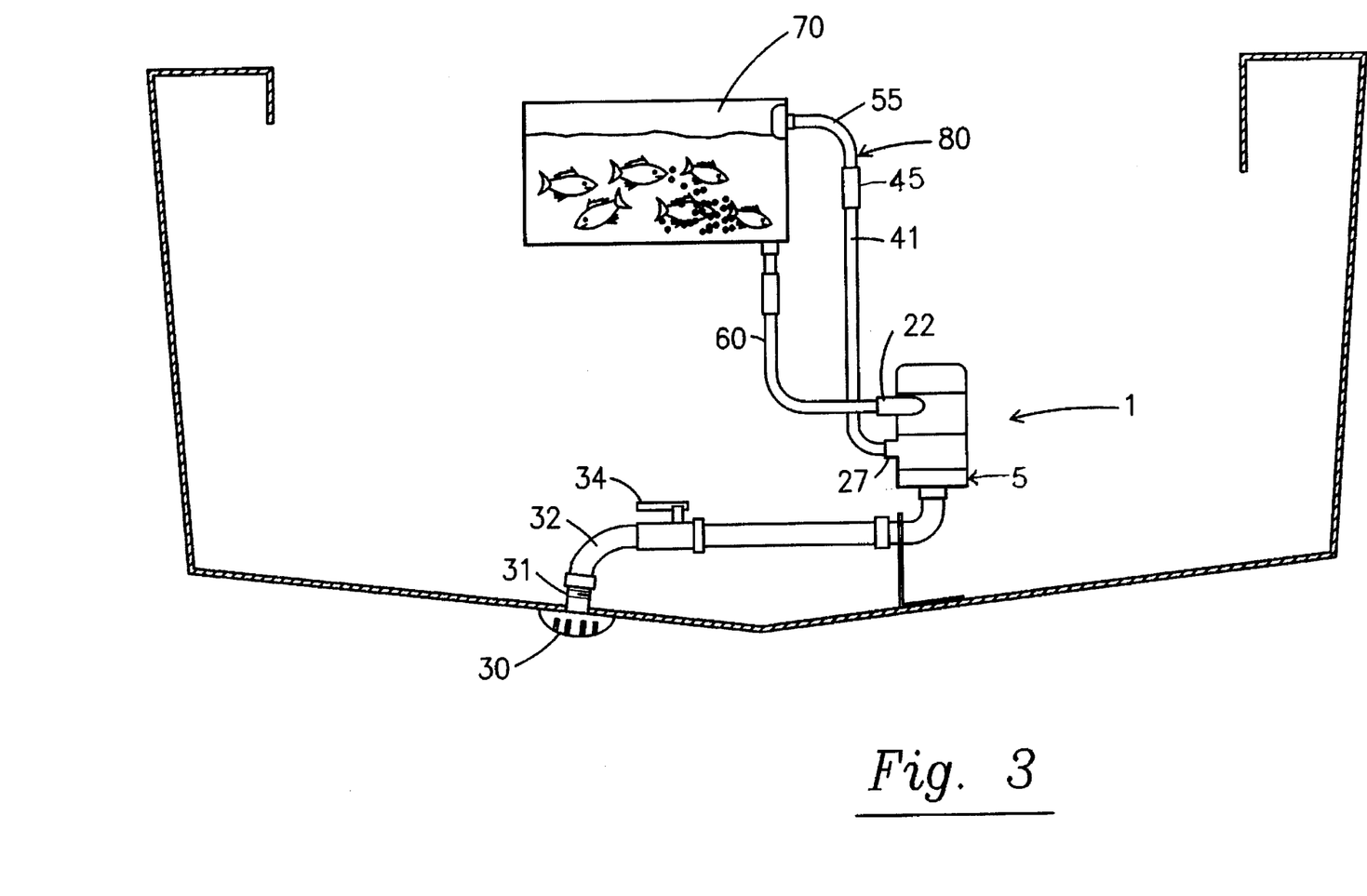
FIG. 3 is a schematic illustrating the aerator of the present invention in a preferred thru-hull mounting.
Figure 8:
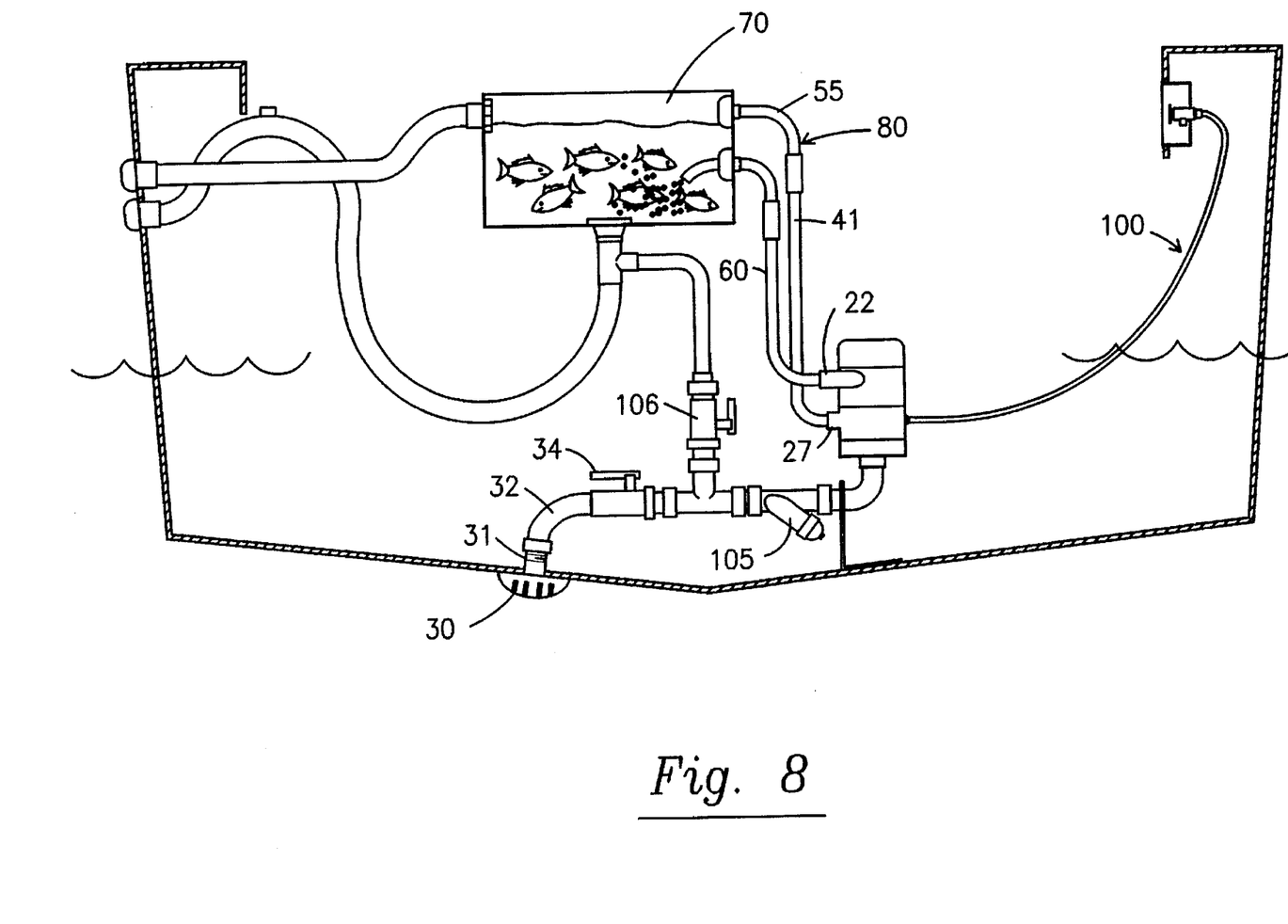
FIG. 8 is a schematic illustrating the second embodiment of the aerator of the present invention in a preferred thru-hull mounting.

As illustrated in FIGS. 3 and 8, the aerator of the present invention may be mounted "thru-the-hull" of the boat at any convenient location within hull. The boat hull having an internal surface, an external surface and a water line. The invention contains a first water conduit with an inlet which goes to the outside of the hull of the sea vessel and an outlet in contact with a fluid inlet. The water conduit passes through the hull of the vessel. However, the device must be positioned below the water level within the boat in that the device is not self-priming. As discussed earlier, the aerator may be segmented into several segments 4, 5 which may be coupled to the impeller housing 3. This segmenting facilitates the mounting of the aerator in a thru-hull position and permits any required maintenance to the aerator. Preferably, located between the aerator segments are rubber o-rings (not shown).

In an exemplary thru-hull mounting of the aerator of the present invention (FIGS. 3 and 8), the boat is externally fitted with an intake scoop 30 which is in communication with water. Preferably, the intake scoop is located in the rear section of the boat near the engines. The intake scoop is also known in the art as an intake strainer or a thru hull pick up tube. In order to further reduce potential airlock while running the boat at high speeds, the intake scoop chosen should have parallel longitudinal running apertures which extend about one-half the total length of the intake scoop. The thru-the-hull mounting of the aerator of the present invention may utilize any marine accessory or fittings known in the industry. A major supplier of such marine accessories and fittings is E & B Discount Marine, Inc. of 201 Meadow Road, P.O. Box 3138, Edison, N.J., as found in E & B Discount Marine, Inc. Catalog '96, pages 304–305 of which is incorporated herein by reference. Preferably, those accessories and fittings utilized below the waterline are glass reinforced with polypropylene to ensure their durability in salt water and vibrating conditions. The hose size of the accessories and fittings utilized may be ¼ to 5 inches, preferably between ½" to 1½", more preferably ⅝" to 1⅛", most preferredly ¾".

As illustrated in FIGS. 3 and 8, the water from outside the boat first travels from the intake scoop 30 through a thru-hull fitting 31 to a 90 degree elbow 32. The water flow can be regulated, either above or below the waterline, by use of a ball valve 34 coupled to the 90 degree elbow 32. The above thru-hull mounting may alternatively be provided with a water strainer 105 (FIG. 8). The thru-hull mounting of the aerator of the present invention may also utilize a T-Connector or Female Tee, a nipple, a hose barb, terminate fittings, pump brackets or right angle thru-hull fittings depending on the space available, the installation location and the pump size of the aerator to be installed.

Figure 6:
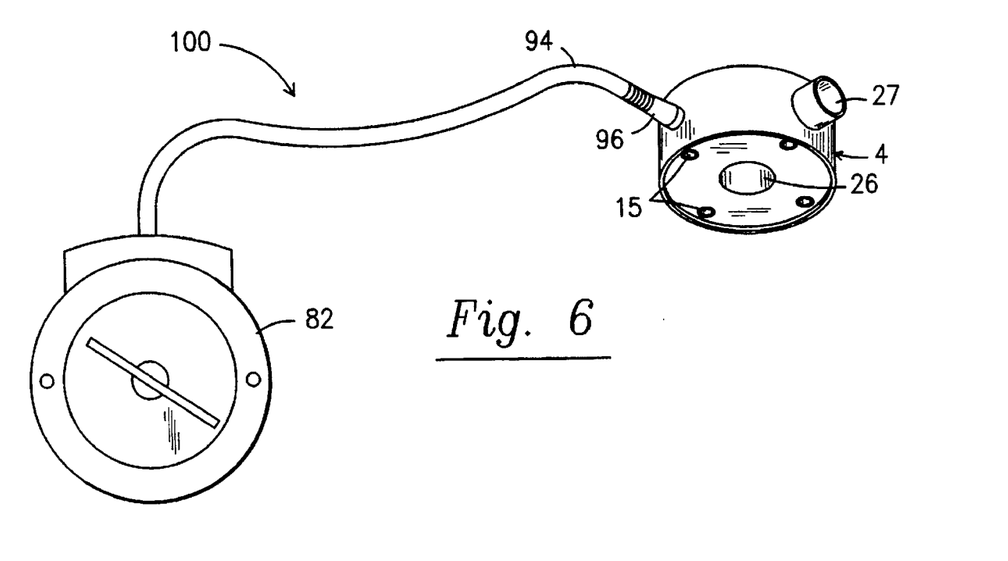
FIG. 6 illustrates a preferred conversion of a conventional centrifugal pump into an aerator of the present invention.
Figure 9:
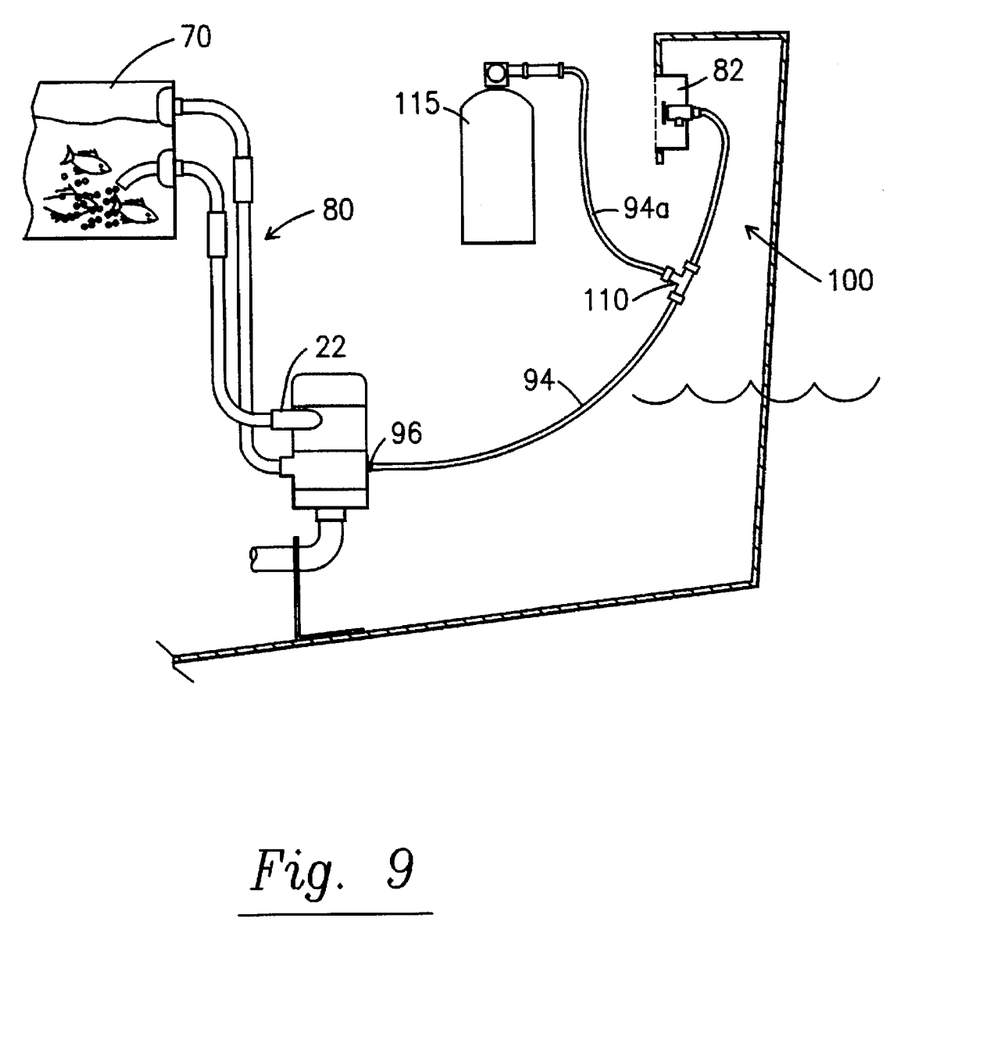
FIG. 9 illustrates a Tee Mounting in the air inlet, leading to an oxygen source.

FIG. 8 illustrates in detail how water may be circulated through a live well system utilizing the aerator of the present invention. When first ball valve 34 is opened and second ball valve 106 is closed, water from outside the boat will circulate through the aerator of the present invention and through the live well. In contrast, when first ball valve 34 is closed and second ball valve 106 is opened the system re-circulates live well water only. When the live well system is re-circulating live well water, for instance when the boat is traveling at high speeds or between salt/brackish/fresh water, the fisherman may wish to introduce a gas containing oxygen, either atmospheric or oxygen under pressure, to the aerator via an air introduction system 100 (FIGS. 6 and 9).

The aerator of the present invention may utilize either a base segment 5 with an angled pick-up tube 42 (FIG. 1a) for thru the transom mounting, or a base segment 5 (FIG. 1) with a straight pick up tube 40. Whichever type of pick up tube is utilized, the pick up tube may employ either straight or taped pick up tube thread. Additionally, the pick up tube may be manufactured in a variety of lengths as known in the industry, preferably the pick up tube will be between 1 to 6 inches in length. The thru-hull aerator may be mounted in several different orientations without greatly affecting its effectiveness. However, the aerator of the present invention is preferably mounted at a 45° angle within the hull of the boat.

In operation, as the water from outside the boat travels through the thru-hull mounting 50 and enters the aerator 1 via the first water conduit 26, it may contain excess air or air bubbles. In the present invention, prior to this air reaching the impeller where it may cause air lock, it is abated through the second fluid outlet 27. The second fluid outlet may also be termed an fluid/air outlet since water and air are intermixed as they travel therethrough. Similarly, when air lock does occur at the impeller, the air, which has a natural tendency to rise, and which is not held down by suction at the inlet of the impeller, may pass up through the water conduit 26 and continue upwards through the second fluid outlet 27. Coupled to the second fluid outlet 27 is a first air conduit (hereinafter air relief hose) 41. As shown, the air relief hose 41 is preferably a flexible tube of a construction and material as readily available from marine suppliers. For instance, Shields Bilgeflex Hose or Shieldsvac XHD Super Premium Hose are suitable. Preferably, the second fluid outlet 27 and air relief hose 41 are ¾" in size such that water and co-mingled air can flow through the hose simultaneously. At the distal end of the air relief hose 41, preferably at the highest point in the hose, is mounted a check valve 45 (illustrated in detail in FIGS. 7a and 7b).

Figure 7A:
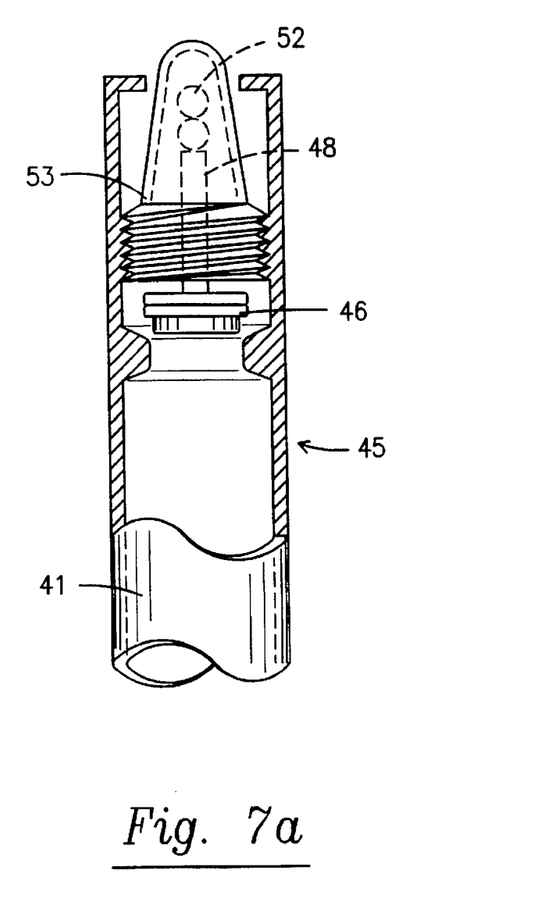
FIG. 7a illustrates a poppet check valve of the type which may be utilized in the aerator of the present invention.
Figure 7B:
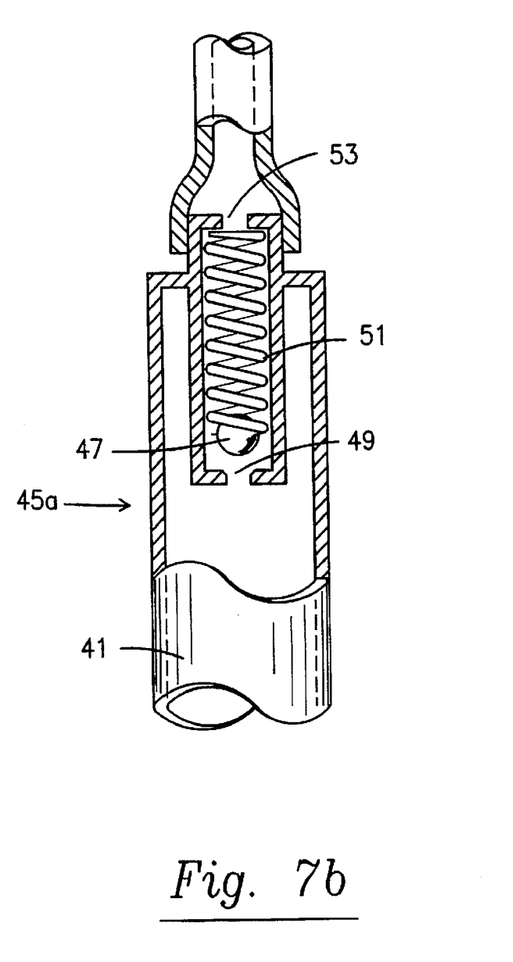
FIG. 7b illustrates a spring check valve of the type which may be utilized in the aerator of the present invention.

The check valve is designed and placed in the air relief hose such that air may be released through the check valve to the atmosphere. Once the air is released and as vacuum is established by the impeller, the check valve closes, preventing air from the atmosphere from entering the system. The poppet check valve 45 includes a disk 46 at the end of a vertically set stem 48. Alternatively, a "spring" check valve 45a which includes a ball 47, urged against a seat 49 may be utilized If the pressure within the air relief hose 41 reaches a predetermined level, the resulting upward force applied to the ball 47 or disk 46 is sufficient to overcome the downward closing force determined by the spring 51 or gravity, or alternatively gravity in conjunction with ball bearings 52. As a result, the ball 47 or disk 46 will commence to open at the predetermined pressure, thereby initiating the release of air or fluid through port 53 of the check valve. Check valve Model Number LC-75 ¾", manufactured by Brady Manufacturing, 2151 Logan Street, Clearwater, Fla. 34625 is suitable for this application. A further example of the use of check valves (for water distribution between a water source such as a lake and a live well without aeration) is disclosed by U.S. Pat. No. 4,708,084 entitled SYSTEM FOR DISTRIBUTING WATER FLOW BETWEEN A RESERVOIR AND A WATER SOURCE, the disclosure of which is incorporated herein by reference.

Once the air lock has been cleared, water surrounds the impeller and flow through the pump is re-established. This causes a vacuum to form between the intake scoop and the impeller. Once the water flow is re-established, water flows through the pump where it is circulated through the impeller housing 3. Oxygenated water then is pumped through the live well hose (hereinafter the second water conduit) 60 to the live well 70 to preserve aquatic organisms therein. The live well hose may be of similar construction and materials to that of the air relief hose. In an alternative embodiment the live well hose may be provided with a check valve to prevent the back flow of water.

When the boat is in high speed operation, the entire aerator system from the intake scoop 30 to the aquatic organism live well 70 becomes pressurized. In this situation, predominantly water will flow through the air relief hose 41 and force its way through the check valve. If the water is not vented into the live well or discharged outside the boat at the highest point in the air relief hose 41, when the boat slows down and the flow diminishes, any water above the check valve would cause back pressure and effectively hold the check valve closed.

Accordingly, an overflow drain tube 55 in communication with the live well 70 is coupled to the distal end of the air relief hose and check valve line 80.

The present inventor had previously investigated and experimented with various aerators and pumps, and discovered that the introduction of a controlled amount of air into the upstream (suction) side leading to a centrifugal pump, can result in a very thorough mincing of air and water and the output of very fine bubbles from the downstream (emission) side leading from the centrifugal pump. In fact, the bubbles are so fine as to give the water a fogged appearance. The unusually high level of oxygenation achieved utilizing this method makes it possible for the first time to pack two to four times as many bait fish into a live well as had previously been possible. While this approach is particularly suited for pumps placed into a live well (i.e., where there is no cavitation) it may have some limitations when used in a thru-hull mounted pump unless utilized with the air relief hose and check valve line 80 of the present invention.

Figure 4:
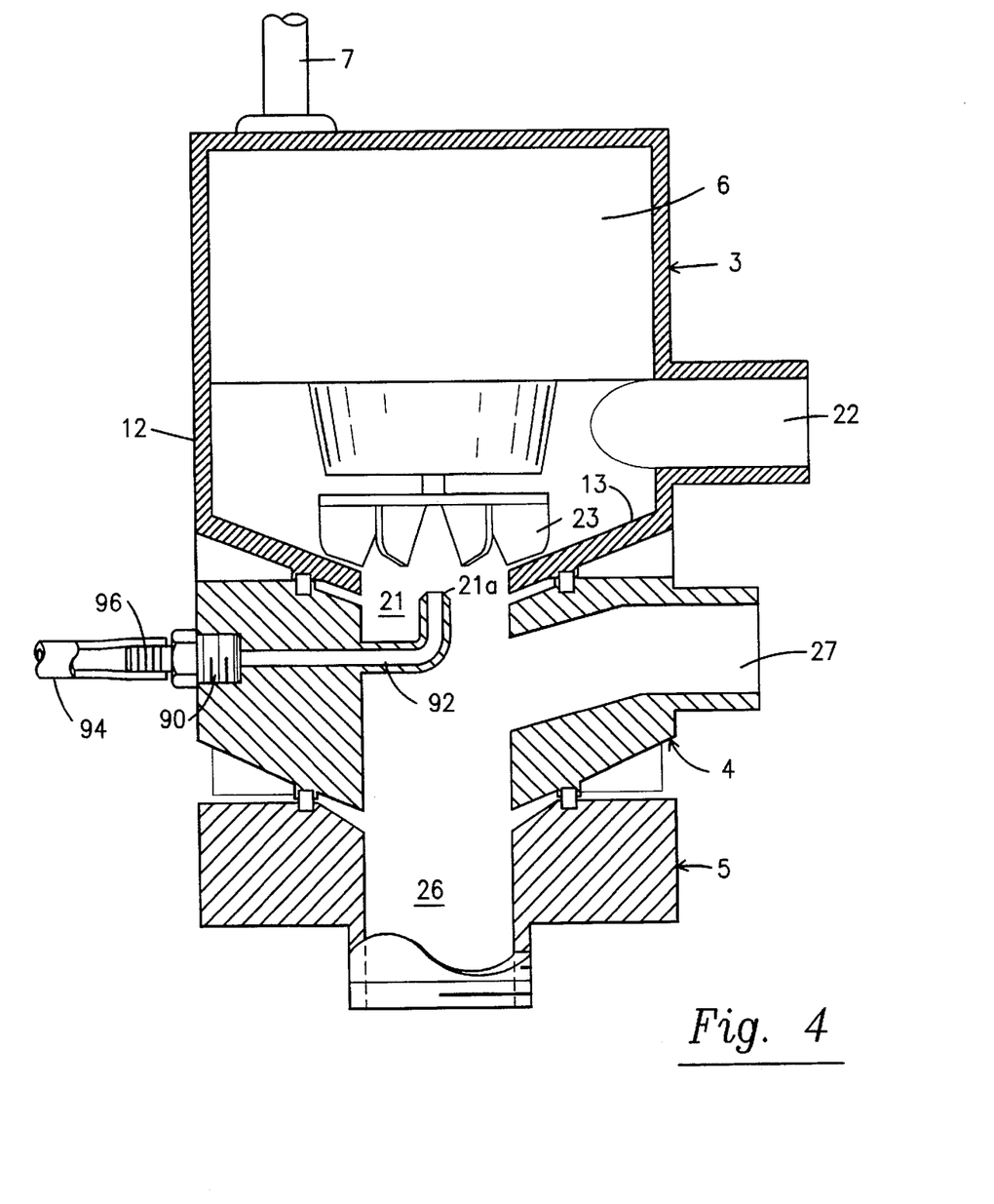
FIG. 4 is a cross-sectional view of a second embodiment of the aerator of the present invention.
Figure 5:
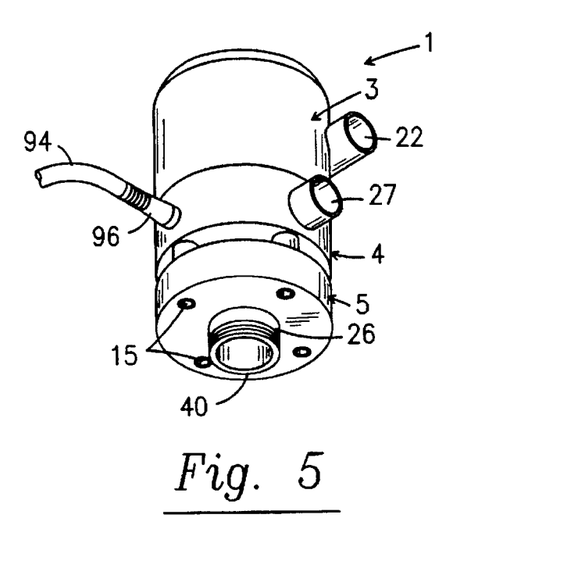
FIG. 5 is a plan view of an aerator illustrating a second embodiment of the present invention.

Accordingly, FIGS. 4, 5 and 8 illustrate a second embodiment of the present invention. The second embodiment of the aerator of the present invention is identical to the first embodiment illustrated in FIG. 2, except for the addition of an air inlet 90 and second air conduit 92 on the air release outlet segment 4. An air tube 94 is attached to the air inlet 90 via a threaded hose barb 96.

As shown, the air tube 94 is preferably a flexible transparent tube of a construction and material as readily available in pet stores for use in association with aquariums. Preferably, the flexible plastic air tube 94 is coupled to a semi-rigid or rigid air conduit 92 which then mouths with the water inlet area 21 of the impeller housing. The advantage of using a separate second air conduit 92 from the air tube 94 is that this permits moving, bending, detaching, and replacing the air tube 94 without disturbing the relationship between the air inlet established by the air conduit 92 and the water inlet area 21 of the impeller housing.

The air tube 94 and second air conduit 92 may be of any diameter, so long as the opening of the air conduit at the water inlet area 21 is within a critical range required for the operation of the aerator. That is, if the diameter of the air hose is too large, even if a small diameter opening were provided at the water inlet 21, the volume of the air in the air tube 94 will make the pump to oscillate or surge, alternatively drawing large bubbles and then no air into the impeller. Further, if the diameter of the air tube 94 is too small, a sufficient supply of air to the impeller for optimal oxygenation is not always possible. This is not conducive to the production of fine bubbles and the smooth operation of the aerator of the second embodiment. The second air conduit 92 is in communication with a gas containing oxygen, either atmospheric or oxygen under pressure, the communication is preferably above the fluid level of the boat transom.

In the second embodiment of the aerator of the present invention, in order to produce small highly oxygenated bubbles, the space between the impeller vanes 23 and the transverse bottom portion of the of the impeller housing 13 is very small, preferably even smaller than shown in FIG. 4. Critical to the proper functioning of the second embodiment is (1) the narrowness or restricted flow of the air at the water inlet 21 and 21a so that no relatively large bubbles are injected into the impeller, (2) the narrowness of the air outlet in comparison to the size of the water inlet so that the suction head of the pump is not disturbed and so that flow into the pump is not impeded, and (3) the close proximity of the air conduit outlet to the water inlet as defined by the plane of the transverse bottom portion 13 of the impeller housing.

The advantage of the second embodiment of the present invention is that even if large bubbles are inadvertently introduced into the impeller via the air conduit 92, the functioning of the controlled air introduction system 100 is not destroyed. Rather, any air bubbles or surges will simply flow through the water conduit and be expelled through second fluid outlet 27 and check valve line 80.

The operation of the aerator will now be described. As seen in FIG. 2, when the electric motor (not shown) is energized, drive shaft 8 rotates causing corresponding rotation of the impeller 10 whereby water is drawn into the water inlet 21, is accelerated by the impeller vanes 23, and is slung out at the tips of the vanes, at which point the water has achieved maximum velocity. The water is redirected upwardly, preferably by the curvature or angularity of the water flow directing means 11 of the impeller housing 3, and is directed upwardly towards the first water outlet 22. While traveling axially upward the velocity of the water is reduced and as a consequence, the potential pressure is increased.

As the impeller begins to pump water in through the water inlet 21 and out through the first water outlet 22, a reduced pressure or suction head will form at the impeller housing water inlet 21. Once the absolute pressure at the water inlet 21 drops below the air pressure at air inlet 90 (FIG. 4), air enters through the air inlet and travels through the air tube and second air conduit 92 and enters into the impeller housing 3 through the water inlet 21a. Initially, air flow metering means 82 (FIGS. 6 and 9) may be partially closed off so that only a part of the potential air flow enters into the air tube and ultimately the air conduit 92. As this partial air flow becomes established (which may take only a few seconds), air flow metering means 82 is operated so as to permit that amount of air flow which will optimally oxygenate the water.

FIG. 6 illustrates the air release outlet segment of the aerator of the present invention. As illustrated, the second embodiment of the present invention is provided with an air introduction system 100, whereby the aerator of the present invention is in communication with a gas containing oxygen. The gas is provided via piping, hose or tubing 94 (hereafter air tube) and the air tube is provided with a petcock, valve, clamp or other air flow metering means 82 by which the amount of air being introduced into the pump inlet can be easily regulated, i.e., to permit adjusting of the relative water and air suction heads. As can readily be determine by one skilled in the air, the air release outlet segment 4 and accompanying air flow metering means 82 and air introduction system 100 (FIG. 6) can be utilized to convert conventionally available bilge and live well pumps into the aerator of the present invention.

As illustrated in FIG. 9, the air tube may be provided with a tee 110 coupled to said air tube 94 at a point between the air flow metering means 82 and the threaded hose barb 96. By utilizing this tee connector 100, the boat owner or fisherman may introduce via flexible tubing 94a a gas containing oxygen under pressure for an oxygen canister or bottle 115. Alternatively, the tee connector 100 may utilize a petcock valve or other flow regulating mechanism. Therefore, depending on the environmental conditions and the amount of oxygen required to the live well, the fisherman may introduce a gas containing oxygen from the atmosphere, pure oxygen under pressure, or a combination of both.

In the second embodiment, optimal oxygenation of the water can be determined visually. An important principle of the present invention is that optimal oxygenation does not depend upon optimal air flow through the air tube 94. Rather, optimal oxygenation depends upon the introduction into the live well of very finely divided air, i.e., ultra fine air bubbles. The air bubbles should have the appearance of a fine mist or fog. The air bubbles are so small as to remain under water for a long period of time, and optimally saturate the water with oxygen. This permits the maintenance in the bait well of two to four times the number of bait fish which had previously been though possible with the best conventionally available oxygenators.

Thus, air flow should be controlled to the point of achieving the maximum amount of the finest air bubbles. When air flow increases to the point where large bubbles are expelled from the oxygenator, the air flow should be reduced.

The output from the aerator of the present invention is uninterrupted, smooth and non-turbulent, so as to provide optimal habitation conditions for live bait, i.e., there is no surge, there is no high turbulence, and the flow is only so great as necessary for the recirculation of water and for the even distribution of oxygen throughout the live bait well.

The oxygenator according to the present invention may be custom built or may be constructed by retrofitting a tube and modified strainer assembly to a known centrifugal pump such as a RULE bilge pump.

Further variations of the oxygenator design may be envisioned within the parameters set forth above. For example, it is a given that the oxygenator will be powered by an electric motor, typically a submersible electric motor. The motor is conventionally situated above the impeller. The motor is connected to the impeller by means of a vertical shaft. Since the shaft is connected to the impeller at one side of the "eye", and since air must be introduced at the "eye", it may be expected that air must be introduced into the impeller from the opposite side of the impeller, i.e., from below. In practice, this is true. That is, it would be possible to construct an aerator wherein a hollow drive shaft extends above the surface of the water for communication with atmosphere, and the drive shaft is connected to the top of the impeller in such a way as to permit introduction of air from the upper side of the impeller. However, to drive the shaft, it would be necessary to provide pulleys and a complex bearing arrangement, or to have the motor situated above the water in which case it would protrude from the bait well, or to have a submersible pump with an upper passage for the hollow drive shaft, which passage would require continuous seal monitoring and would be prone to leakage. Accordingly, providing air from above the impeller with an "upright" pump (as described above) may be possible, but in practice supplying air from below is much more practical.

In both the second embodiments of the present invention, the mixture of water and air which enters the impeller is violently agitated and leaves the outlet of the impeller pump in the form of water with very fine air bubbles giving the appearance of fogging the water. In some cases the air bubbles may be so fine that it will be difficult to tell whether the pump is aerating or not. In that case, placement of a hand in front of the outlet in the live well (not shown) will either cause a rapid buildup of bubbles on the skin, showing that the aerator is working, or will result in no bubbles forming on the skin, in which case no aeration is occurring.

The aerator of the present invention is rather powerful and need not be run full time. The aerator may be energized cyclically in a pattern set by a timer. Alternatively, the aerator may be energized responsive to sensor input, such as oxygen saturation sensors, as discussed in, e.g., U.S. Pat. No. 5,320,068, which teaches a system for the automatic control of oxygenation for agriculture.

Although the aerator was first designed as an aerator for aquatic organisms in a live well, it will be readily apparent that the device is capable of use in a number of other applications, such as for use with a "standard" bilge pump. Often, a boat may contain a bilge pump for the purpose of pumping accumulated water from the boat. When the pump is activated, water is drawn from the bilge through the pump and forced out of the boat through the hose and fitting. Although this invention has been described in its preferred form with a certain degree of particularity with respect to an aerator, it is understood that the present disclosure of the preferred form has been made only by way of example and that numerous changes in the details of structures and the composition of the combination may be resorted to without departing from the spirit and scope of the invention.

Now that the invention has been described,

What is claimed is:

1. A thru-hull aerator device for aerating aquatic organisms, said aerator device comprising:

a boat hull having an internal surface and an external surface and having a water line;

a non-self-priming centrifugal pump;

a first water conduit for communication between the exterior of the boat hull below the water line and said pump;

a second water conduit for communication between said pump and said aquatic organisms;

a first air conduit for communication between said pump and a gas containing oxygen;

wherein said pump includes an impeller, an impeller housing containing said impeller, said impeller housing having at least a first inlet and first and second outlets, wherein said first inlet is in communication with said first water conduit, said first outlet is in communication with said second water conduit, and said second outlet is in communication with said first air conduit, and wherein said first inlet and second outlet are provided upstream of said impeller, and said first outlet is provided downstream of said impeller.

2. A thru-hull aerator device as in claim 1, wherein said first air conduit is provided with a check valve which closes when the pressure in said first air conduit is below a predetermined pressure, and opens when the pressure in said air conduit exceeds said predetermined pressure.

3. A thru-hull aerator device for aerating aquatic organisms in a volume of water, said device comprising:

(a) a centrifugal type pump for pumping fluids, said pump comprising:

an impeller comprising a disk-shaped impeller plate and a plurality of radial impeller vanes attached to said impeller disk, the vanes having inner and outer edges, the respective vanes projecting generally perpendicularly from said impeller disk and having flow passages defined therebetween, the inner edges of said plurality of vanes defining an impeller inlet eye;

a fluid-tight means for driving said impeller;

an impeller housing generally surrounding said impeller and comprising at least an outer wall and a transverse wall, said transverse wall being generally transverse to the axis of rotation of the impeller and on the side of the impeller opposite the side upon which the drive means is provided, said transverse wall having a surface in close proximity to said impeller vanes, which housing is shaped so as to define a fluid inlet and a first fluid outlet;

(b) an air release outlet segment coupled to said impeller housing and upstream of impeller, said air release outlet segment comprising a housing having a water inlet, a water outlet in communication with said impeller inlet, and a second fluid outlet;

(c) an air conduit for communication between said second fluid outlet of said air release outlet chamber and the atmosphere; and (d) a water conduit having an inlet in communication with water outside the hull of a sea vessel and an outlet in communication with said air release outlet segment water inlet.

4. A thru-hull aerator device as in claim 3, wherein said second fluid outlet of said air release outlet segment housing has joined therein a check valve line, said check valve line comprising an air relief hose having a distal and a proximal end; and a check valve joined to the distal end of said air relief hose.

5. A thru-hull aerator as in claim 4, wherein said check valve line further comprises an overflow drain tube joined distal to said check valve.

6. A thru-hull aerator as in claim 3, wherein said first fluid outlet of said impeller housing has coupled thereto a live well hose, said live well hose being in communication with a volume of water to be aerated.

7. A thru-hull aerator device as in claim 3, wherein said second fluid outlet is disposed between said base segment and said impeller.

8. A thru-hull aerator as in claim 3, wherein said base segment further comprises an angled pick up tube.

9. A thru-hull aerator as in claim 3, wherein said base segment further comprises a straight pick up tube.

10. A thru-hull aerator device as in claim 3, wherein said first and second fluid outlets have an outer diameter within the range of ¼ to 5 inches.

11. The thru-hull aerator device as in claim 3, wherein said first and second fluid outlets have an outer diameter within the range of ⅝ to 1⅛ inches.

12. A thru-hull aerator device for aerating aquatic organisms in a volume of water, said device comprising:

a fluid-tight means for driving said impeller;

an impeller housing generally surrounding said impeller and comprising at least an outer wall and a transverse wall, said transverse wall being generally transverse to the axis of rotation of the impeller and on the side of the impeller opposite the side upon which the drive means is provided, said transverse wall having a surface in close proximity to said impeller vanes, which housing is shaped so as to define a fluid inlet and a first fluid outlet;

an air release outlet segment coupled to said impeller housing, said air release outlet segment comprising a housing generally encompassing said impeller housing, having a second fluid outlet coupled to a first air conduit;

an air fluid outlet which is located between water conduit that conveys water and said impeller housing;

a base segment coupled to said air release outlet segment, the base segment with at least an outer wall and transverse wall which comprise a housing, said base segment transverse wall having apertures defined therein to receive fasteners; said base segment transverse wall having apertures defined therein to receive fasteners;

a water conduit having in inlet in communication with water outside the hull of a sea vessel and an outlet in communication with said aperture defining a fluid inlet, said water conduit passing through the hull of a sea vessel; and a second air conduit having an air inlet in communication with a gas containing oxygen, having an air outlet in close proximity to the suction side of said centrifugal type pump.

13. The thru-hull aerator device as in claim 12, wherein said gas containing oxygen is atmospheric.

14. The thru-hull aerator device as in claim 12, wherein said gas containing oxygen is oxygen under pressure.

15. The thru-hull aerator device as in claim 12, wherein said second air conduit is coupled to said air release outlet segment.

16. The thru-hull aerator device as in claim 12, wherein said second air conduit further comprises an air flow metering means between said air conduit inlet and outlet.

17. The thru-hull aerator device as in claim 12, wherein at least a part of said second air conduit comprises flexible tubing.

18. A process for aeration of aquatic organisms in a volume of water, said process comprising
  (i) providing a thru-hull aerator, said aerator comprising:
    (a) a fluid-tight means for driving an aerator impeller;
      an impeller housing generally surrounding said impeller and comprising at least an outer wall and a transverse wall, said transverse wall being generally transverse to the axis of rotation of the impeller and on the side of the impeller opposite the side upon which the drive means is provided, said transverse wall having a surface in close proximity to said impeller vanes, which housing is shaped so as to define a fluid inlet and a first fluid outlet;
    (b) an air release outlet segment coupled to said impeller housing, said air release outlet segment comprising a housing generally encompassing said impeller housing;
      an air fluid outlet which is located between water conduit that conveys water and said impeller housing;
    (c) a base segment coupled to said air release outlet segment, the base segment with at least an outer wall and transverse wall which comprise a housing, said base segment transverse wall having apertures defined therein to receive fasteners; said base segment transverse wall having apertures defined therein to receive fasteners; and
    (d) a water conduit having an inlet in communication with water outside the hull of a sea vessel and an outlet in communication with said aperture defining a fluid inlet, said water conduit passing through the hull of a sea vessel,
  (ii) mounting said aerator thru-the-hull of a sea vessel such that said water conduit is in communication with water,
  (iii) placing said air-fluid outlet in communication with the atmosphere,
  (iv) placing said fluid outlet in communication with the volume of water to be aerated,
  (v) energizing said means for driving said impeller to cause rotation of said impeller and thereby establish a suction head at said fluid inlet of said impeller.

19. The process for aeration of aquatic organisms in a volume of water as in claim 18, further comprising the step of adjusting an air metering means to regulate air flow through an air conduit into said impeller.

20. A thru-hull aerator device for aerating the water supply of aquatic organisms, said device comprising:
  (a) a centrifugal type pump for pumping fluids, said pump comprising
    an impeller comprising an impeller disk and a plurality of radial impeller vanes attached to said impeller disk, the vanes having inner and outer edges, the respective vanes projecting generally perpendicularly from said impeller disk and having flow passages defined therebetween, the inner edges of said plurality of vanes defining an impeller inlet eye;
    fluid-tight means for driving said impeller;
    an impeller housing generally surrounding said impeller and comprising at least an outer wall and a transverse wall, said transverse wall being generally transverse to the axis of rotation of the impeller and on the side of the impeller opposite the side upon which the drive means is provided, said transverse wall including an aperture defining a fluid inlet, said outer wall including an aperture defining a fluid outlet, said transverse wall having a planar surface area in close proximity to said impeller vanes; and
  (b) an air channel having an air inlet in communication with a gas containing oxygen, having an air outlet in close proximity to said aperture in said transverse wall defining a fluid inlet, and an air flow metering means between said air channel inlet and outlet.

21. The thru-hull aerator device as in claim 20, wherein said gas containing oxygen is atmospheric.

22. The thru-hull aerator device as in claim 20, wherein said gas containing oxygen is oxygen under pressure.

* * * * *